April 28, 1959     G. F. UPTON     2,883,885
TURBINE OR COMPRESSOR ROTORS
Filed May 13, 1958
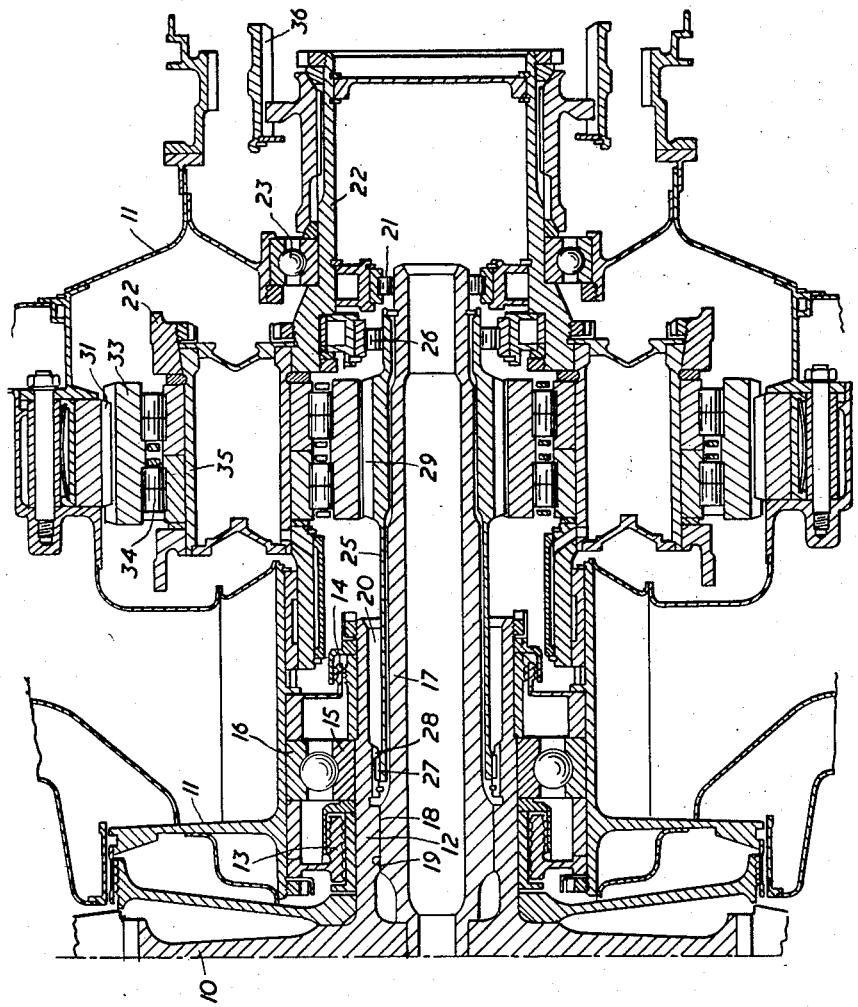
INVENTOR
GEORGE F. UPTON
BY
Watson, Cole, Grindle & Watson
ATTORNEY United States Patent Office 2,883,885
Patented Apr. 28, 1959

2,883,885

TURBINE OR COMPRESSOR ROTORS

George Frank Upton, Borehamwood, England, assignor to D. Napier & Son Limited, London, England, a British company Application May 13, 1958, Serial No. 735,026

Claims priority, application Great Britain May 15, 1957

5 Claims. (Cl. 74—801)

This invention relates to turbine or compressor rotors which are mounted in the overhung manner, that is to say with bearings on one side of the rotor only. It is usual in such cases to provide a main bearing disposed close to the rotor and an outrigger bearing at a distance from the rotor. Where the drive from the rotor (in the case of a turbine) or to the rotor (in the case of a compressor) is through gearing, it is convenient and is a known practice to mount the gear wheel that rotates with the rotor upon the rotor shaft at a suitable point between the main and outrigger bearings. This arrangement, however, has certain disadvantages which the present invention overcomes. One disadvantage of the known arrangement is that if there is any torsional vibration or whip in the rotor shaft this will be imparted to the said gear wheel which may set up chatter in the gear train. Secondly, owing to the stiffness of the shaft due both to gyroscopic effects of the turbine rotor and to the bearings the gear wheel has virtually no freedom of movement in the radial direction, and limited freedom for radial movement is sometimes desirable, for instance if the gear wheel concerned forms the sun wheel of an epicyclic gear train. Thirdly, the rotor shaft must carry not only the bending forces imposed by its rotor-supporting function, but also torsional forces due to the transmission of the drive.

According to the present invention in an overhung turbine or compressor rotor supported by main and outrigger bearings there is an annular recess in the rotor shaft inwardly spaced from the inner race of the main bearing, and a gear wheel is mounted between the main and outrigger bearings on a hollow shaft surrounding the rotor shaft with a slight clearance therefrom, which hollow shaft enters the said recess and is connected to the rotor shaft by a driving connection in the zone of the main bearing.

Since the part of the rotor shaft in the zone of the main bearing is the steadiest part of the shaft and is virtually free from whip, by making the driving connection to or from the gear wheel in this zone any whip which may occur in other parts of the rotor shaft will be not imparted to the gear wheel. Moreover, since the gear wheel is mounted on a hollow shaft separate from the rotor shaft, the hollow shaft can be supported with sufficient freedom for radial movement to suit the requirements of the particular gear train. Furthermore, the length of the rotor shaft between the main bearing and the outrigger bearing is entirely freed from torsional forces due to the transmission of the drive to or from the gear wheel.

One form of turbine rotor embodying the invention will now be described by way of example with reference to the accompanying drawing, which is a sectional elevation of the turbine rotor and associated parts.

Referring to the drawing, the turbine rotor 10 is a single-stage disc-type rotor mounted in the overhung manner in a rigid casing 11. Extending axially from the rear side of the rotor disc is an integral cylindrical sleeve 12 forming part of the rotor shaft. This sleeve carries gas and oil seals 13, 14 and also the inner race 15 of a main ball bearing, the outer race 16 of this bearing being housed in the said casing. Secured to the centre of the rotor disc is one end of a shaft 17 which extends through the interior of the said cylindrical sleeve 12. This inner shaft forms the rest of the rotor shaft and has an external cylindrical surface 18 which is a snug fit within a corresponding internal cylindrical surface 19 in the sleeve 12 so that relative movement between the two parts of the rotor shaft is prevented. The said cylindrical surfaces 18 and 19 terminate short of the zone of the main bearing, and there is an annular recess 20 between the sleeve 12 and the inner shaft 17 inwardly spaced from the inner race 15 of the main bearing and extending to the rear end of the sleeve 12.

The rear end of the inner shaft 17 is supported in an outrigger bearing 21 which is itself supported in a rotatable planet wheel carrier 22 of an epicyclic gear train through which the turbine drive is transmitted. This planet wheel carrier is itself supported in a bearing 23 in the rigid casing 11.

Surrounding the inner shaft 17 with a slight radial clearance therefrom is a hollow shaft 25, the rear end of this hollow shaft 25 being supported in a bearing 26 in the planet wheel carrier, which bearing is mounted in such a manner that it has a limited degree of radial freedom in the planet wheel carrier. The front end of the hollow shaft 25 enters the said recess 20 between the sleeve 12 and the inner shaft 17 and is provided with external splines 27 which engage corresponding internal splines 28 formed in the sleeve in the zone of the main bearing, whereby a drive is transmitted from the sleeve 12 to the hollow shaft 25. Gear teeth 29 are formed on the hollow shaft 25 to constitute the sun wheel of the epicyclic gear train.

The ring gear 31 of the epicyclic gear train is mounted in the casing 11. The planet gears 33 which mesh with the sun gear 29 and the ring gear 31 are supported on bearings 34 on hollow shafts 35 fixed to the planet carrier 22. The drive from the turbine is taken from the planet wheel carrier 22 by a splined connection 36.

What I claim as my invention and desire to secure by Letters Patent is:

1. An overhung bladed rotor assembly comprising a bladed rotor disc, a rotor shaft extending axially from said rotor disc on one side thereof, said rotor shaft having an axially-extending annular recess therein, a main bearing having an inner race mounted on said rotor shaft surrounding said annular recess, an outrigger bearing adjacent the end of said rotor shaft remote from said rotor disc, a hollow shaft surrounding a part of said rotor shaft and radially spaced therefrom, said hollow shaft having a portion which enters said recess in said rotor shaft, a driving connection between said hollow shaft and said rotor shaft disposed within said inner race of said main bearing, and a gear wheel on said hollow shaft between said main bearing and said outrigger bearing.

2. A rotor assembly according to claim 1 in which there is an outrigger bearing for said hollow shaft adjacent the end of said hollow shaft remote from said rotor disc.

3. A rotor assembly according to claim 2 in which said gear wheel is the sun wheel of an epicyclic gear train, said epicyclic gear train including a ring gear, planet gears and a planet gear carrier, and in which said assembly includes a rigid casing supporting said ring gear, bearing means in said rigid casing supporting said planet carrier, and supporting means in said planet carrier supporting said outrigger bearings.

4. A rotor assembly according to claim 3 in which said driving connection between said rotor shaft and said hollow shaft comprises a ring of inwardly-facing splines in said annular recess in said rotor shaft, and a ring of outwardly-facing splines on said hollow shaft engaging said ring of inwardly-facing splines.

5. A rotor according to claim 1 in which said driving connection between said rotor shaft and said hollow shaft comprises a ring of inwardly-facing splines in said annular recess in said rotor shaft, and a ring of outwardly-facing splines on said hollow shaft engaging said ring of inwardly-facing splines.

No references cited.